L. E. WATERMAN.
POLE ATTACHMENT.
APPLICATION FILED APR. 11, 1911.
1,000,652.
Patented Aug. 15, 1911.
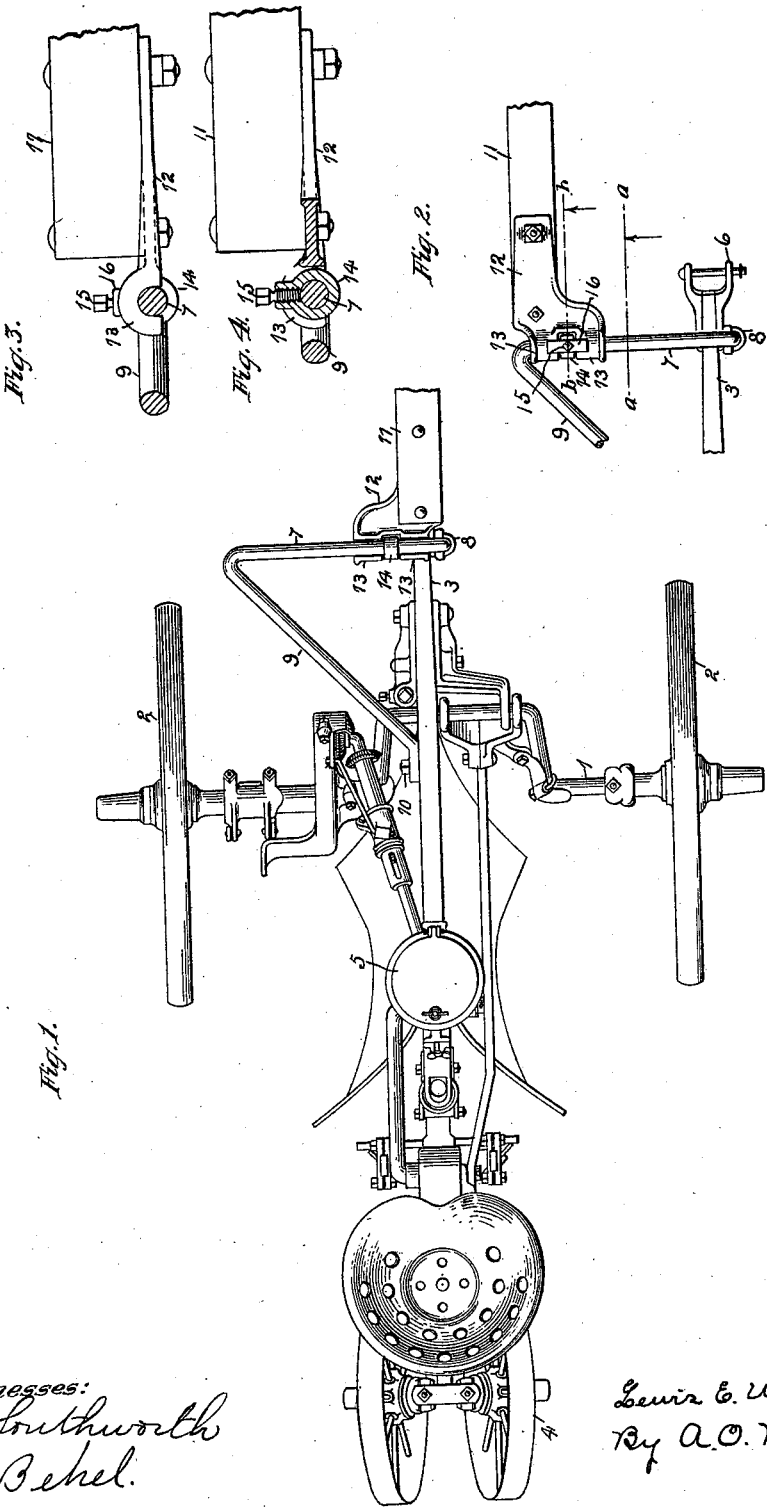

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

POLE ATTACHMENT.

1,000,652.   Specification of Letters Patent.   Patented Aug. 15, 1911.

Application filed April 11, 1911. Serial No. 620,421.

*To all whom it may concern:*

Be it known that I, LEWIS E. WATERMAN, a citizen of the United States, residing at Rockford, in the county of Winnebago and State of Illinois, have invented certain new and useful Improvements in Pole Attachments, of which the following is a specification.

The object of this invention is to provide means for connecting the pole to a wheeled plow or lister so that it can be adjusted laterally to the line of draft.

In the accompanying drawings, Figure 1 is a plan view of a lister to which I have applied my improvements. Fig. 2 is a partial plan view of the forward end of a lister beam, and my improvements in connection therewith. Fig. 3 is a section on dotted line $a\,a$ Fig. 2. Fig. 4 is a section on dotted line $b\,b$ Fig. 2.

The lister to which I have applied my improvements comprises the axle 1, supporting wheels 2, plow beam 3, rear supporting wheels 4 and seeding devices 5. To the forward end of the plow beam 3 is connected a clevis 6. A bar 7 is connected to the forward end of the plow beam by the clamp 8, and a diagonally arranged section 9 of this bar is connected to the plow beam by the bolt 10. The bar 7 is cylindrical in cross-section. A pole 11 has a plate 12 bolted to it, and this plate is provided with two curved hooks 13 separated some distance. These curved hooks 13 are fitted to the conformation of the bar 7. An eye 14 is located on the bar 7 and is held in connection therewith in an adjustable manner by the set screw 15. A cross bar 16 forming a part of the eye 14 extends in the lengthwise direction of the bar 7, and is of a length to overlie the curved hooks 13 of the plate 12. The eye 14 being located between the curved hooks 13 serves to prevent the lateral displacement of the pole with relation to the bar 7, but allows a vertical movement of the pole around the bar as a pivot. The cross bar 16 overlying the curved hooks 13 holds the pole in engagement with the bar 7, and by loosening the set screw 15 the eye 14 and the cross bar connected to it can be turned free of the curved hooks which will allow the removal of the pole, or the pole can be turned over as shown at Fig. 1, so as to bring it in line with the plow beam.

I claim as my invention.

A pole attachment comprising a suitable support, a pole, two curved hooks connected with the pole and adapted to engage the support, an eye and cross bar adjustably connected with the support, the eye located between the curved hooks and the cross bar adapted to hold the curved hooks in contact with the support.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents, Washington, D. C."